United States Patent Office 3,352,646
Patented Nov. 14, 1967

3,352,646
PROCESS FOR PRODUCING $N_2O_3 \cdot 11.8HF$
Richard S. Siegel, Scarsdale, N.Y., assignor to the United States of America as represented by the United States Atomic Energy Commission
No Drawing. Filed Jan. 29, 1965, Ser. No. 429,183
3 Claims. (Cl. 23—356)

ABSTRACT OF THE DISCLOSURE

A process for producing hydrogen fluoride complexes of nitrogen trioxide containing about 11.8 molecular equivalents of hydrogen fluoride per molecular equivalent of nitrogen trioxide comprising mixing liquid hydrogen fluoride with sodium nitrite, fractionally distilling the mixture and collecting the portion boiling off between 66° C. and 70° C.

---

This invention is related to a process for producing hydrogen fluoride complexes of nitrogen trioxide containing 11.8 molecular equivalents of hydrogen fluoride per molecular equivalent of nitrogen trioxide.

Solutions of the character of $N_2O_3 \cdot 11.8HF$ are useful in processes for the dissolution of and recovery of fissile values from uranium containing neutronic reactor fuel elements. Heretofore these solvent solutions have been prepared by physically mixing liquified hydrogen fluoride and nitrogen trioxide with all the attendant expense in handling and storing nitrogen trioxide. Further, commercially available nitrogen trioxide contains many impurities which must be removed prior to its use in such process.

It is an object of this invention to provide those skilled in the art with an efficient, economical process for producing $N_2O_3 \cdot 11.8HF$ in a highly purified state which does not require the use of gaseous nitrogen trioxide.

This and other objects of this invention will in part be obvious and will in part be shown hereinafter.

I have discovered a process for producing hydrogen fluoride complexes of nitrogen trioxide containing 11.8 molecular equivalents of hydrogen fluoride per molecular equivalent of nitrogen trioxide ($N_2O_3 \cdot 11.8HF$) comprising intimately mixing sodium nitrite ($NaNO_2$) with liquid hydrogen fluoride, fractionally distilling the resulting mixture and collecting that portion which boils off at a temperature found at 66° C. to about 70° C. The mol ratios of hydrogen fluoride to sodium nitrite can vary over the widest possible ranges, however, for the sake of process efficiency in the preferred embodiment of my invention I employ a mixture containing about 12 molecular equivalents of hydrogen fluoride per molecular equivalent of sodium nitrite and the distillate is collected at a temperature of about 68° C.

EXAMPLE I 17.1 grams of sodium nitrite ($NaNO_2$) and 60.9 grams of liquid hydrogen fluoride were placed in a reaction vessel and warmed to room temperature. The warmed mixture was then fractionally distilled and 41.0 grams of product were collected at a reflux temperature of about 67° C. Gas phase infra-red analysis showed the product to be $N_2O_3 \cdot 11.8HF$ in a highly purified state.

The corrosive nature of hydrogen fluoride and the reaction products produced by my novel process require the use of corrosion resistant materials and safety precautions which are well known to those skilled in the art. Sodium nitrite and hydrogen fluoride are both readily available commercially in a highly purified state. Thus it is obvious that my invention provides an economical, efficient method of producing $N_2O_3 \cdot 11.8HF$ in a highly purified state.

What is claimed is:
1. A process for producing $N_2O_3 \cdot 11.8HF$ comprising intimately mixing liquid hydrogen fluoride with sodium nitrite, fractionally distilling the mixture and collecting that portion of the mixture which boils off at a temperature ranging from about 66° C. to about 70° C.
2. The process of claim 1 wherein said mixture contains about 12 molecular equivalents of liquid hydrogen fluoride per molecular equivalent of sodium nitrite.
3. The process of claim 2 wherein the portion of the liquid is collected that boils off at a temperature of about 68° C.

References Cited
UNITED STATES PATENTS
3,145,078 7/1964 Strickland et al. _____ 23—324
3,185,541 5/1965 Anello et al. _____ 23—356 X

OTHER REFERENCES
Seel et al.: "Angewandte Chemie," vol. 69, page 153, (1957).
Stacy et al.: "Advances in Fluorine Chemistry," vol. 5, pages 8–11, (1965).

MILTON WEISSMAN, *Primary Examiner.*